Nov. 29, 1960 W. DILLENBURGER 2,962,545

AUTOMATIC FLYING SPOT SCANNER LIGHT INTENSITY CONTROL

Filed Sept. 16, 1957 3 Sheets-Sheet 1

Inventor:
Wolfgang Dillenburger
By Michael S. Striker
Attorney

AUTOMATIC FLYING SPOT SCANNER LIGHT INTENSITY CONTROL

Filed Sept. 16, 1957

Inventor:
Wolfgang Dillenburger
By Michael S. Striker
Attorney

Inventor:
Wolfgang Dillenburger
by Michael S. Striker
Attorney

United States Patent Office 2,962,545
Patented Nov. 29, 1960

2,962,545

AUTOMATIC FLYING SPOT SCANNER LIGHT INTENSITY CONTROL

Wolfgang Dillenburger, Darmstadt, Germany, assignor to Fernseh G.m.b.H., Darmstadt, Germany Filed Sept. 16, 1957, Ser. No. 686,554

Claims priority, application Germany Sept. 19, 1956

11 Claims. (Cl. 178—5.4)

The present invention refers to television apparatus, and more specifically to a method and apparatus for automatically controlling the emission of color video signals from a photo-responsive pick-up device.

In connection with apparatus for the transmission of color video images the problem arises to maintain the intensity of the video signals during the transmission of different color images substantially constant.

In the field of transmitting monochrome or black and white video images it is known to provide for the video signal and amplifier with automatic amplification control and to automatically vary the amplification by deriving from the video signal potential a D.C. control potential which is applied as grid bias for one or more amplifier tubes so as to shift the work point along their characteristics curve into areas of different steepness. If this known method is applied to apparatus for the transmission of color video images, three separate variable amplifiers are required, which is a disadvantage. Besides, in the course of practical operation, it is hardly possible to provide for an equipment in which the control characteristics of several variable amplifiers are sufficiently identical with each other and, in addition, could be maintained so for a substantial period of time which would be necessary in order to make sure that in response to a certain control potential identically introduced to all three amplifiers the amplification factors would always be the same between the three amplifiers.

It is a main object of the invention to provide a method and an apparatus for controlling the emission of color video signals in such a manner that the maximum amplitude of the color video signals is maintained substantially constant.

It is a further object of the invention to provide an apparatus of the type set forth which is composed of a comparatively small number of reliable components so as to assure a smooth and automatic operation.

With the above objects in view the method according to the invention mainly comprises the steps of projecting light of variable intensity on an object the image of which is to be transmitted and photo-electrically resolving the picture of the illuminated object into a plurality of video signals each representing a color component of the picture. Then each of these signals are injected into one of a plurality of comparator circuits permitting passage of only the signal surplus exceeding a voltage maximum predetermined for each of said component color video signals, respectively. Whenever such signal surplus voltages appear at the output of any one of said comparator circuits, then such signal surplus voltage is introduced into one common circuit comprising means for obtaining a voltage which proportionally represents at any moment said signal surplus voltage, or the sum of several thereof if there exists at any given moment more than one thereof. The voltage representing at any moment the signal surplus or the sum of more than one thereof, is now applied to means adapted to vary the intensity of light projected on the object so as to eliminate any signal surplus, whereby the amplitudes of the various component color video signals emitted from the pick-up device are automatically limited to a substantially constant maximum, while the relative distribution of energy between the components of the light spectrum remains nevertheless unchanged.

The apparatus according to the invention is composed of elements and circuits adapted to carry out the method.

The voltage representing a signal surplus is preferably rectified before being applied to the means adapted to vary the intensity of light projected on the object.

The method and apparatus according to the invention entail above all the advantage that the control of all of a plurality of color video signals is carried out entirely uniformly for all of them. In addition, it is not necessary to use variable amplifiers at all, regular amplifiers having a constant amplification factor can be used satisfactorily.

Another advantage of the method and apparatus according to the invention resides in the fact even if the predetermined maximum value of only one of the three color video signals is exceeded the output strength of all the three color video signals is reduced to identically the same degree.

If the predetermined maximum values are exceeded simultaneously in the emission of two or all three of the color video signals then the output strength of the various color video signals is reduced by an amount which corresponds to the sum of the signal surplus voltages of the individual color video signals, a feature that is to be considered as one more advantage offered by the method and apparatus according to the invention.

It should be noted that by the method according to the invention excessive applications of control are safely avoided in the whole transmission system so that all the conditions required for a faithful reproduction of the original hues of color are met.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
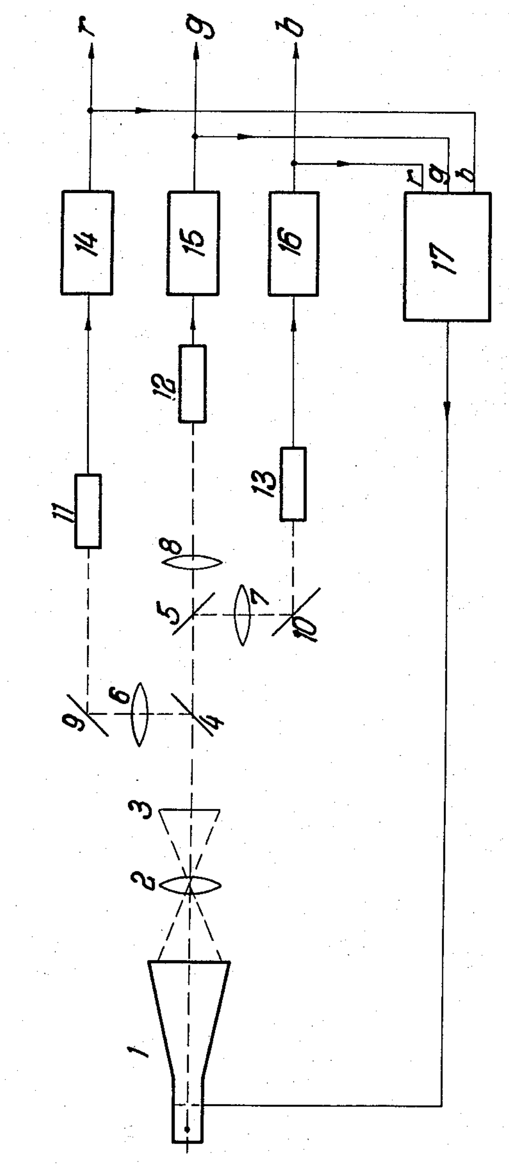
Fig. 1 illustrates diagrammatically a pick-up device including scanning means operating in connection with a transparent picture carrier.

In Fig. 1 the numeral 1 denotes a cathode-ray tube of the scanning type having the usual control and other electrodes (not shown) by means of which a colorless (white) dot pattern is produced on the incandescent screen of the tube. The dot pattern is projected by optical means 2 on the transparent color picture 3. The light which passes dot by dot through the picture 3 is then resolved by translucent mirrors 4 and 5 into three color components (red, green and blue). These three color components are transmitted by means of condenser lenses 6, 7 and 8 and, as far as necessary, by mirrors 9 and 10 to the three photocells 11, 12 and 13, respectively. The output potentials furnished by the photocells are injected into the amplifiers 14, 15 and 16 whereafter the corresponding output voltages are adapted to constitute the desired color video signals appearing at the exit terminals *r*, *g* and *b*.

At the same time, the above-mentioned output voltages are introduced, respectively, to the input terminals *r′*, *g′* and *b′* of a device 17 wherein any signal surplus exceeding a predetermined maximum voltage is converted into a variable control potential which is applied to the electrically controllable means for varying the intensity of the light projected on the picture 3, as will be explained below.

Figure 2:
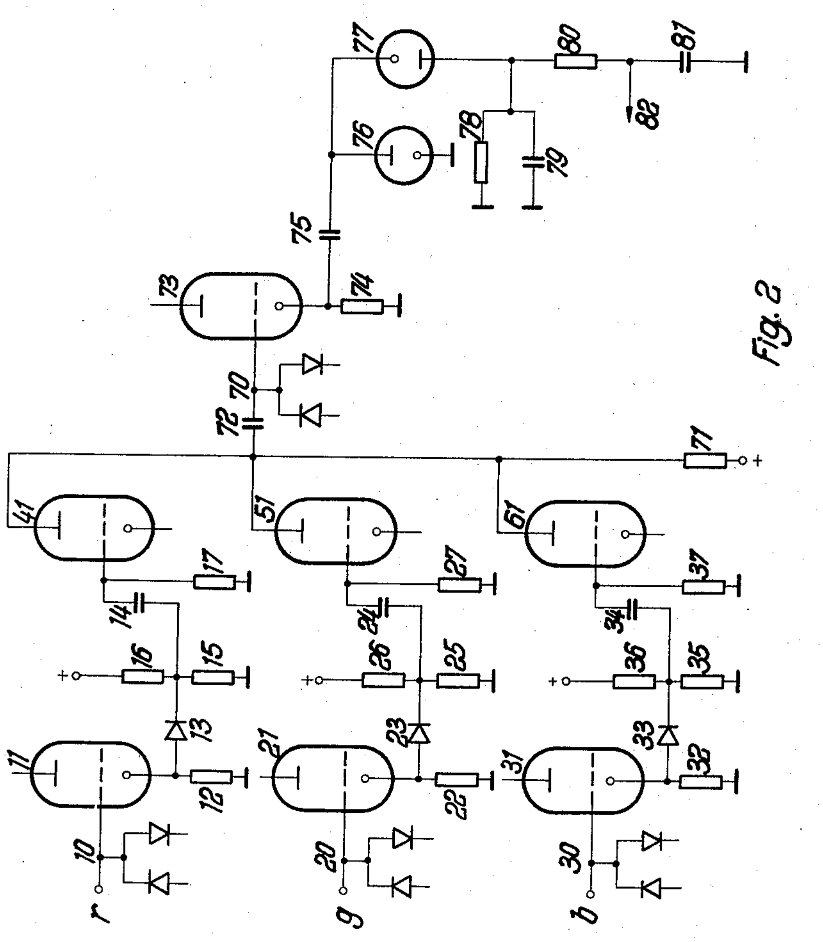
Fig. 2 is a circuit diagram illustrating details of the circuits used in the device illustrated by Fig. 1.

The device 17 is illustrated in greater detail by Fig. 2. As mentioned above, the output potentials of the photocells 11, 12, 13 are suitably amplified and delivered, respectively, at the exit terminals *r*, *g*, *b* from where they are transmitted through the input terminals *r′*, *g′*, *b′*, respectively, to three cathode amplifier circuits 11, 21, 31, respectively. The potentials applied to the grid terminals 10, 20, 30, respectively, of the tubes of these three amplifier circuits are stabilized to correspond to the desired black level of the image by means of a clamping circuit connected to each of the terminals 10, 20, 30. The clamping circuits are represented diagrammatically by rectifiers connected with opposite polarities to said terminals. The cathode circuits of the amplifier means 11, 21, 31, respectively, include cathode resistances 12, 22, 32, respectively. The signal potentials appearing at the cathodes of the amplifier means are applied via a rectifier 13, 23, 33, respectively, and a condenser 14, 24, 34, respectively, to the control grid of another amplifier tube 41, 51, 61, respectively.

Each of the rectifiers 13, 23, 33 is provided by a suitable source of potential through a voltage divider 15, 16; 25, 26; 35, 36; respectively, with a bias potential so that each particular rectifier is conductive only when at the cathodes of the amplifier means 11, 21, 31, respectively, a signal surplus appears which exceeds a predetermined maximum voltage depending upon said bias potential. Therefore, the control gird of any one of the tubes 41, 51, 61, respectively, is supplied with a control potential only when in at least one of the three color channels the permissible or desirable maximum value of the video signal is exceeded.

The amplifier tubes 41, 51, 61 have their anodes connected in parallel and have a common anode resistance 71. The anode circuits which are connected in parallel are, on the other hand, connected via a condenser 72 to another amplifier tube 73. The potential applied to the grid terminal 70 of this tube is stabilized to correspond to the black level of the picture by means of a clamping circuit which again is represented by two rectifiers connected with opposite polarities to the terminal 70.

It can be seen therefore that whenever the amplitude of the video signals exceeds a maximum predetermined by the bias potential applied to rectifiers 13, 23, 33, respectively, such signal surplus will act through the control grid of the tube 73 irrespective of which of the three color channels such surplus has appeared in. The tube 73 is arranged as a cathode amplifier and is provided with a cathode resistance 74. Any voltage peaks that may appear are transmitted from the cathode of the tube 73 via a condenser 75 to a rectifier means which consists, for instance, of two diodes 76 and 77 connected with opposite polarities in the circuit, a resistor 78 and a condenser 79 connected in parallel with the resistor. A negative potential appears therefore at the output resistor 78, the magnitude of this potential depending upon the amounts of signal surplus voltages exceeding predetermined maxima set for the three color channels, respectively.

The periodically undulating components of the control voltage obtained in the manner described above may be suppressed by a filter device comprising a resistor

80 and a condenser 81. The desired control potential is available at the output terminal 82 of the apparatus from where it is applied to the control means as stated above.

The control potential obtained from the device 17 is used for varying the illumination of the picture, without affecting the distribution of energy among the spectral components, in such a manner that the intensity of light projected on the picture is varied by and in proportion with the control potential so as to maintain the maximum amplitude of the color video signals substantially constant.

In an embodiment in which a scanning type cathode-ray tube according to Fig. 1 is used, a variation of the intensity of light projected on the picture 3 can be effected in a very simple manner by controlling the light intensity of the dot pattern produced on the screen of the tube through application of the control potential to the brightness control electrode of the tube (Wehnelt electrode).

Figure 3:
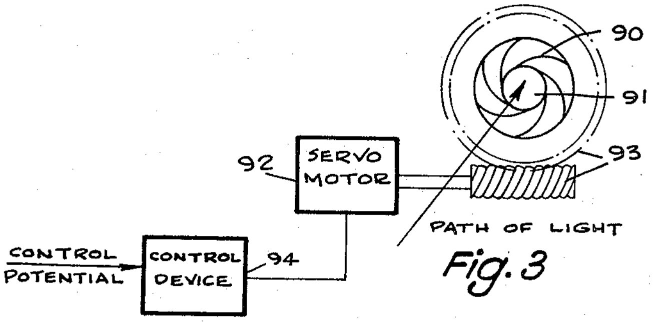
Fig. 3 illustrates diagrammatically a variable light stop.

As shown in Fig. 3, the intensity of the light projected on the object may be varied also by interposing between a source of light of constant intensity and the color picture a light stop 90 having an aperture 91 of variable diameter which is varied electrically or electro-mechanically e.g. through a servo-motor 92 and gears 93, controlled by the control potential applied to a control device 94. Any conventional means of changing the diameter of such an aperture upon application of an outside force can be used for this purpose.

It is also possible to interpose between a source of light of constant intensity and the color picture a variable filter the translucency of which is varied as required, electrically or electro-mechanically, by application of the control potential.

Figure 4:
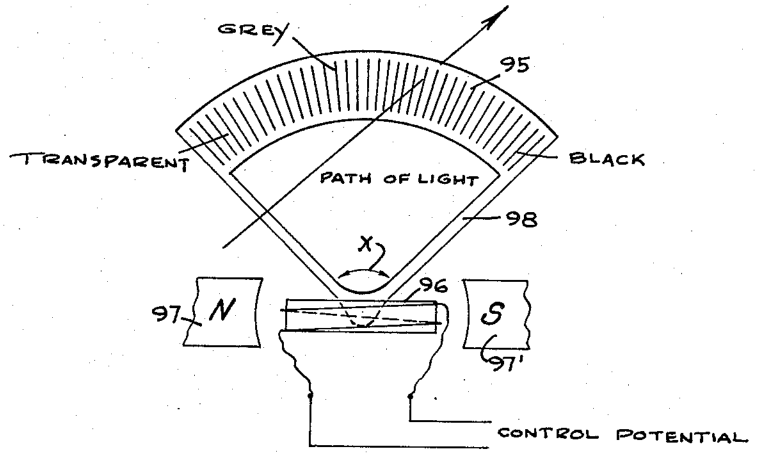
Fig. 4 shows diagrammatically a variable filter.
Figure 5:
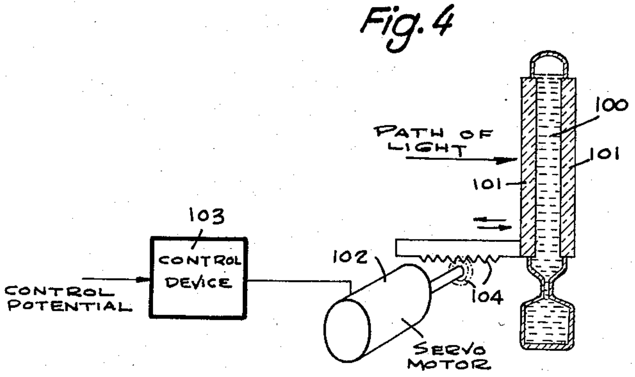
Fig. 5 is a diagrammatic illustration of another variable filter that may be used in connection with the device of Fig. 1.

A variable filter device of this type may consist for instance as shown by Fig. 4, of a strip or an annular member 95 of progressively increasing opaqueness or blackness along its length or circumference, respectively, so that by varying the relative position of different portions of such a filter with respect to the path of light from the source of light to the object the intensity of light reaching the object is varied accordingly. The change of position of the filter 95 is effected by moving it in the directions of arrow X electrically or electro-mechanically by applying the control potential to a pivotable coil 96 mounted between permanent magnets 97, 97′ and connected with the filter carrier 98. Moreover, the filter means may consist, as shown by Fig. 5, of a fluid filter 100 comprising two plates of transparent material 101, spaced from and parallel to each other with the body of filter fluid 100 tainted a neutral gray located between the plates 101. At least one of the two plates is movable with respect to the other so that by changing the spacing between the plates 101 the absolute translucency of the filter 100 can be varied. The movement of at least one of the plates 101 may be effected electrically or electromechanically by applying the control potential via a control device 103 to a servomotor 102 operating the one plate through gear means 104.

The method and apparatus according to the invention is applicable to all color television systems provided that the object the image of which is to be transmitted, is illuminated by a source of light and that a plurality of color video signals are produced by the pick-up device.

It will be understood that each of the elements described above, or two or more together, may also find a useful application in other types of electrical control systems differing from the types described above.

While the invention has been illustrated and described as embodied in a color television system, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A method of automatically maintaining the amplitude of color video signals emitted from a photo-responsive pick-up device below a substantial constant maximum, comprising the steps of projecting light of variable intensity on an object the image of which is to be transmitted; photo-electrically resolving the picture of the illuminated object into a plurality of video signals each representing a color component of said picture; separating from each of said signals any existing signal surplus exceeding a voltage maximum predetermined for each of said component color video signals, respectively; combining any of said signal surplus voltages that may appear as individual signal outputs into one common output voltage proportionally representing at any moment the sum of said signal surplus voltages, respectively, and applying said common output voltage for varying the intensity of light projected on said object so as to eliminate any signal surplus, whereby the amplitudes of the various component color video signals emitted from the pick-up device are automatically limited to a substantially constant maximum, while the relative distribution of energy between the components of the light spectrum remains unchanged.

2. A method of automatically maintaining the amplitude of color video signals emitted from a photo-responsive pick-up device below a substantially constant maximum, comprising the steps of projecting light of variable intensity on an object the image of which is to be transmitted; photo-electrically resolving the picture of the illuminated object into a plurality of video signals each representing a color component of said picture; separating from each of said signals any existing signal surplus exceeding a voltage maximum predetermined for each of said component color video signals, respectively; combining any of said signal surplus voltages that may appear as individual signal outputs into one common rectified output voltage proportionally representing at any moment the sum of said signal surplus voltages, respectively, and applying said common rectified output voltage for varying the intensity of light projected on said object so as to eliminate any signal surplus, whereby the amplitudes of the various component color video signals emitted from the pick-up device are automatically limited to a substantially constant maximum, while the relative distribution of energy between the components of the light spectrum remains unchanged.

3. Apparatus for automatically maintaining the amplitude of color video signals emitted from a photo-responsive pick-up device below a substantially constant maximum, comprising, in combination, illumination means for projecting light of variable intensity on an object the image of which is to be transmitted, including electrically controllable means for varying the intensity of the light projected on said object; photo-electric means for resolving the picture of the illuminated object into a plurality of video signals each representing a color component of said picture, said photo-electric means including a plurality of first amplifiers each respectively producing one amplified component color video signal; one comparator circuit assigned to each of said signals and connected with its input to the output, respectively, of one of said first amplifiers, each of said comparator circuits comprising means for blocking passage of the signal introduced into the particular circuit, except for any signal surplus exceeding a voltage maximum predetermined for each of said component color video signals, respectively, each of said comparator circuits further including second amplifier means for amplifying such signal surplus voltage, the outputs of all of said second amplifier means being connected in parallel to a common output for furnishing a voltage proportionally representing at any moment the sum of said signal surplus voltages, respectively, introduced, if any, from said comparator circuits; and circuit means connecting said common output with said electrically controllable means for varying the intensity of the light projected on said object so as to eliminate any signal surplus, whereby the amplitudes of the various component color video signals emitted from the pick-up device are automatically limited to a substantially constant maximum, while the relative distribution of energy between the components of the light spectrum remains unchanged.

4. Apparatus for automatically maintaining the amplitude of color video signals emitted from a photo-responsive pick-up device below a substantially constant maximum, comprising, in combination, illumination means including a cathode-ray tube and optical means for projecting light of variable intensity on an object the image of which is to be transmitted, said cathode-ray tube having a brightness control electrode for varying the intensity of the light projected on said object; photo-electric means for resolving the picture of the illuminated object into a plurality of video signals each representing a color component of said picture, said photo-electric means including a plurality of first amplifiers each respectively producing one amplified component color video signal; one comparator circuit assigned to each of said signals and connected with its input to the output, respectively, of one of said first amplifiers, each of said comparator circuits comprising means for blocking passage of the signal introduced into the particular circuit, except for any signal surplus exceeding a voltage maximum predetermined for each of said component color video siganls, respectively, each of said comparator circuits further including second amplifier means for amplifying such signal surplus voltage, the outputs of all of said second amplifier means being connected in parallel to a common output for furnishing a voltage proportionally representing at mined for each of said component color video signals, respectively, introduced, if any, from said comparator circuits; and circuit means connecting said common output with said brightness control electrode for varying the intensity of the light projected on said object so as to eliminate any signal surplus, whereby the amplitudes of the various component color video signals emitted from the pick-up device are automatically limited to a substantially constant maximum, while the relative distribution of energy between the components of the light spectrum remains unchanged.

5. Apparatus for automatically maintaining the amplitude of color video signals emitted from a photo-responsive pick-up device below a substantially constant maximum, comprising, in combination, illumination means for projecting light of variable intensity on an object the image of which is to be transmitted, including electrically controllable filter means for varying the intensity of the light projected on said object by varying the translucency of said filter; photo-electric means for resolving the picture of the illuminated object into a plurality of video signals each representing a color component of said picture, said photo-electric means including a plurality of first amplifiers each respectively producing one amplified component color video signal; one comparator circuit assigned to each of said signals and connected with its input to the output, respectively, of one of said first amplifiers, each of said comparator circuits comprising means for blocking passage of the signal introduced into the particular circuit, except for any signal surplus exceeding a voltage maximum predetermined for each of said component color video signals, respectively, each of said comparator circuits further including second amplifier means for amplifying such signal surplus voltage, the outputs of all of said second amplifier means being connected in parallel to a common output for furnishing a voltage proportionally representing at any moment the sum of said signal surplus voltages, respectively, introduced, if any, from said comparator circuits; and circuit means connecting said common output with said electrically controllable filter means for varying the intensity of the light projected on said object so as to eliminate any signal surplus, whereby the amplitudes of the various component color video signals emitted from the pick-up device are automatically limited to a substantially constant maximum, while the relative distribution of energy between the components of the light spectrum remains unchanged.

6. An apparatus as set forth in claim 5, wherein said filter means comprises two transparent plates spaced from and parallel with each other, and a body of fluid uniformly tinted neutral grey located between said plates, at least one of said plates being movable relatively to the other one for altering the absolute translucency of said body of fluid by altering the spacing between said plates.

7. Apparatus for automatically maintaining the amplitude of color video signals emitted from a photo-responsive pick-up device below a substantially constant maximum, comprising, in combination, illumination means for projecting light of variable intensity on an object the image of which is to be transmitted, including electrically controllable means for varying the intensity of the light projected on said object, said electrically controllable means comprising light stop means interposed in the path of light directed at said object, and including an aperture of a diameter variable by electrical control; photo-electric means for resolving the picture of the illuminated object into a plurality of video signals each representing a color component of said picture, said photo-electric means including a plurality of first amplifiers each respectively producing one amplified component color video signal; one comparator circuit assigned to each of said signals and connected with its input to the output, respectively, of one of said first amplifiers, each of said comparator circuits comprising means for blocking passage of the signal introduced into the particular circuit, except for any signal surplus exceeding a voltage maximum predetermined for each of said component color video signals, respectively, each of said comparator circuits further including second amplifier means for amplifying such signal surplus voltage, the outputs of all of said second amplifier means being connected in parallel to a common output for furnishing a voltage proportionally representing at any moment the sum of said signal surplus voltages, respectively, introduced, if any, from said comparator circuits; and circuit means connecting said common output with said electrically controllable means for varying the intensity of the light projected on said object so as to eliminate any signal surplus, whereby the amplitudes of the various component color video signals emitted from the pick-up device are automatically limited to a substantially constant maximum, while the relative distribution of energy between the components of the light spectrum remains unchanged.

8. Apparatus for automatically maintaining the amplitude of color video signals emitted from a photo-responsive pick-up device below a substantially constant maximum, comprising, in combination, illumination means for projecting light of variable intensity on an object the image of which is to be transmitted, including electrically controllable means for varying the intensity of the light projected on said object; photo-electric means for resolving the picture of the illuminated object into a plurality of video signals each representing a color component of said picture, said photo-electric means including a plurality of first amplifiers each respectively producing one amplified component color video signal; one comparator circuit assigned to each of said signals and connected with its input to the output, respectively, of one of said first amplifiers, each of said comparator circuits comprising a bias-potential controlled electronic valve circuit for blocking passage of the signal introduced into the particular circuit, except for any signal surplus exceeding a voltage maximum predetermined for each of said component color video signals, respectively, each of said comparator circuits further including second amplifier means for amplifying such signal surplus voltage, the outputs of all of said second amplifier means being connected in parallel to a common output for furnishing a voltage proportionally representing at any moment the sum of said signal surplus voltages, respectively, introduced, if any, from said comparator circuits; and circuit means including a common output resistor for said second amplifier means and connected to said common output, and rectifier means connected to said common output for rectifying said voltage furnished by said second amplifier means, and circuit means for furnishing said voltage after rectification to said electrically controllable means for varying the intensity of the light projected on said object so as to eliminate any signal surplus, whereby the amplitudes of the various component color video signals emitted from the pick-up device are automatically limited to a substantially constant maximum, while the relative distribution of energy between the components of the light spectrum remains unchanged.

9. Apparatus for automatically maintaining the amplitude of color video signals emitted from a photo-responsive pick-up device below a substantially constant maximum, comprising, in combination, illumination means for projecting light of variable intensity on an object the image of which is to be transmitted, including electrically controllable means for varying the intensity of the light projected on said object; photo-electric means for resolving the picture of the illuminated object into a plurality of video signals each representing a color component of said picture, said photo-electric means including a plurality of first amplifiers each respectively producing one amplified component color video signal; one comparator circuit assigned to each of said signals and connected with its input to the output, respectively, of one of said first amplifiers, each of said comparator circuits comprising a cathode amplifier circuit, a half-wave rectifier connected at its input with the cathode of said amplifier circuit, a source of potential and a voltage divider means connected to the output of said rectifier for applying a predetermined bias-potential to said rectifier for blocking passage of the signal introduced into the particular circuit, except for any signal surplus exceeding a voltage maximum predetermined for each of said component color video signals, respectively, each of said comparator circuits further including second amplifier means for amplifying such signal surplus voltage, the outputs of all of said second amplifier means being connected in parallel to a common output for furnishing a voltage proportionally representing at any moment the sum of said signal surplus voltages, respectively, introduced, if any, from said comparator circuits; and circuit means including a common output resistor for said second amplifier means and connected to said common output, a cathode amplifier tube connected to said common output for amplifying said voltage furnished by said second amplifier means, and rectifier means connected to said cathode amplifier tube for rectifying said amplified voltage, and circuit means for furnishing said voltage after rectification to said electrically controllable means for varying the intensity of the light projected on said object so as to eliminate any signal surplus, whereby the amplitudes of the various component color video signals emitted from the pick-up device are automatically limited to a substantially constant maximum, while the relative distribution of energy between the components of the light spectrum remains unchanged.

10. An apparatus as set forth in claim 9, wherein said cathode amplifier circuit, forming part of said comparator circuit, includes a clamping circuit for stabilizing the grid potential of said cathode amplifier corresponding to the black level desired for the image.

11. An apparatus as set forth in claim 9, wherein said circuit means includes a clamping circuit connected to said cathode amplifier tube for stabilizing the grid potential thereof corresponding to the black level desired for the image.

References Cited in the file of this patent

UNITED STATES PATENTS

| | | |
|---|---|---|
| 2,607,845 | Clark | Aug. 19, 1952 |
| 2,710,889 | Tobias | June 14, 1955 |
| 2,807,660 | Rose | Sept. 24, 1957 |
| 2,842,610 | Crosfield et al. | July 8, 1958 |